United States Patent [19]
Sharper et al.

[11] Patent Number: 6,141,377
[45] Date of Patent: Oct. 31, 2000

[54] METHOD AND APPARATUS FOR VOICE FREQUENCY NOISE REDUCTION IN SPLITTERLESS ADSL

[75] Inventors: Craig A. Sharper, Los Altos, Calif.; Kyung-Yeop Hong, Concord, Mass.

[73] Assignee: Cisco Technology, Inc., San Jose, Calif.

[21] Appl. No.: 09/124,866

[22] Filed: Jul. 30, 1998

[51] Int. Cl.[7] ...................................................... H04B 1/38
[52] U.S. Cl. .................. 375/222; 375/296; 379/93.05; 379/340; 379/414; 455/126
[58] Field of Search .................................... 375/219, 222, 375/296; 379/93.05–93.07, 340, 398, 414, 415; 455/63, 73, 126

[56] References Cited

PUBLICATIONS

News Release Jun. 9, 1998; http://www.uawg.org/june_9.html; pp. 1–2; Jun. 9, 1988.
Oct. 22, 1998; http://www.uawg.org/oct_22.html; pp. 1–3; Oct. 22, 1998.
Major step towards the Global Information Society: New Standards for Multi–Megabit/s Network Access adopted including G.Lite; http://www.itu.int/newsroom/press/releases/1998/NP–4.html; pp. 1–2; Oct. 29, 1998.

*Primary Examiner*—Amanda T. Le
*Attorney, Agent, or Firm*—Hamilton, Brook, Smith & Reynolds, PC

[57] ABSTRACT

An ADSL modem provides compensation for a nonlinear telephone impedance by predistorting transmit signals such that the voltage across the nonlinear impedance is correct independent of the impedance. Correcting the voltage across the nonlinear impedance reduces noise in the telephone due to intermodulation products generated in the voice band. The modem comprises a transmitter that includes (a) a signal source providing a source data signal and (b) a predistortion circuit for predistorting the source data signal to provide a modem transmit signal for coupling to a transmission loop having a nonlinear impedance coupled thereto. The modem device further includes a receiver for receiving a modem receive signal from the transmission loop. The source data signal comprises source digital words, each source digital word corresponding to a particular voltage level. The predistortion circuit includes a memory for mapping the source digital words to predistortion digital words, each predistortion digital word corresponding to a particular desired voltage level. The transmitter further includes a digital-to-analog converter for converting the predistortion digital words into the modem transmit signal. A feedback circuit coupled to the loop measures the distortion of the modem transmit signal to provide a feedback signal to the predistortion circuit that is indicative of the measured distortion. The predistortion circuit adjusts the amount of predistortion in response to the feedback signal.

19 Claims, 6 Drawing Sheets

METHOD AND APPARATUS FOR VOICE FREQUENCY NOISE REDUCTION IN SPLITTERLESS ADSL

BACKGROUND OF THE INVENTION

The local or "last mile" portion of telephone company networks primarily consists of copper transmission loops that were originally designed to carry relatively low bandwidth voice signals. The demand for high bandwidth data services, including internet access and video conferencing, has led to the development of digital subscriber line (xDSL) technology to serve these increased demands over the existing copper loops. The "x" in xDSL is a placeholder for referring to different versions that have been proposed in the telecommunications industry to handle different services. These different versions include asymmetric digital subscriber line (ADSL), high-speed digital subscriber line (HDSL), symmetric digital subscriber line (SDSL) and very high-speed digital subscriber line (VDSL). ADSL provides a high-speed, downstream data channel to subscribers and a lower-speed, upstream data channel to the network while simultaneously providing lifeline Plain Old Telephone Service (POTS) over a single copper loop. ADSL uses the frequency spectrum of the copper loop between 4 KHz to 2.2 MHz to carry the downstream and upstream data channels and uses the frequency spectrum between 0 KHz and 4 KHz for POTS.

FIG. 1 shows a splitter-based ADSL system which includes an ADSL modem 100 and passive splitter 102 at customer premises 103 connected over transmission loop 112 to passive splitter 114 and ADSL modem 120 at central office 105. In a splitter-based approach, the respective passive splitters 102, 114 at the customer premises and central office ends of the copper loop are used to separate low frequency POTS signals (i.e., voice) from high frequency ADSL signals. Thus, at the customer premises, ADSL modem 100 receives data signals for computer 108 through high pass filter 104 and telephone device 110 receives voice signals through low pass filter 106. At the central office end of the loop, ADSL modem 120 receives data signals for a data switch (not shown) through high pass filter 116 and voice signals are separated by low pass filter 118 to connect to a voice switch (not shown).

A difficulty with the splitter-based approach is the cost and time needed to install the passive splitter at the customer premises. An approach that eliminates the passive splitter at the customer premises is shown in FIG. 2. In the splitterless approach, ADSL modem 100A and telephone 110 can be plugged directly into any telephone jack in the home. The splitterless ADSL modem 100A includes a built-in high pass filter 104A to prevent voice frequencies from reaching the modem 100A. However, without the splitter 102 (FIG. 1), high frequency data signals generated by ADSL modems 100A, 120 can appear across the telephone 110. Although these high frequencies are above the normal range of human hearing, nonlinearities in the telephone 110 produce intermodulation products from the ADSL signals in the voice band which contribute a significant amount of noise in the telephone 110.

One approach to this noise problem is to lower the transmit power of the ADSL modems 100A, 120 which, because of the nonlinearity, causes a greater reduction in noise at the telephone 110. However, this reduction of transmit power also results in a reduction in the modem bit rate since the signal-to-noise ratio is reduced.

A telephone is either in the off-hook state (i.e., in use) or the on-hook state (i.e., idle). A further problem with the splitterless approach is that the off-hook impedance of the telephone 110 at the ADSL frequencies is quite different from on-hook conditions and varies from telephone to telephone. Although ADSL transmission protocols generally are robust enough to compensate for these impedance changes, it becomes necessary to interrupt data transmission for at least one second in order to perform modem retraining whenever a telephone switches between the on-hook and off-hook states.

SUMMARY OF THE INVENTION

The above and other problems are solved by the method and apparatus of the present invention which provides compensation for a nonlinear telephone impedance by predistorting transmit signals of an ADSL modem such that the voltage across the nonlinear impedance is correct independent of the impedance. By compensating or correcting the voltage across the nonlinear impedance, the present invention reduces noise in the telephone due to intermodulation products generated in the voice band. Further, the compensated or corrected transmit voltage is less affected by on-hook/off-hook transitions so that the amount of modem retraining can be greatly reduced.

Accordingly, a modem device comprises a transmitter including (a) a signal source providing a source data signal and (b) a predistortion circuit for predistorting the source data signal to provide a modem transmit signal for coupling to a transmission loop having a nonlinear impedance coupled thereto. The predistortion circuit compensates for distortion of the modem transmit signal due to the nonlinear impedance. The modem device further includes a receiver for receiving a modem receive signal from the transmission loop. The source data signal comprises source digital words, each source digital word corresponding to a particular analog voltage level. The predistortion circuit includes a mapping table for mapping the source digital words to predistortion digital words, each predistortion digital word corresponding to a particular desired analog voltage level. The transmitter further includes a digital-to-analog converter for converting the predistortion digital words to the modem transmit signal.

In a preferred embodiment, the predistortion circuit includes a multiplier for multiplying each source digital word with a corresponding predistortion digital word from the mapping table to provide a multiplier digital word which the digital-to-analog converter converts to the corresponding modem transmit signal.

According to an aspect of the invention, the transmitter further includes a feedback circuit coupled to the transmission loop for measuring the distortion of the modem transmit signal to provide a feedback signal to the predistortion circuit that is indicative of the measured distortion. The predistortion circuit adjusts the amount of predistortion in response to the feedback signal. The feedback circuit includes a comparison circuit having a reference voltage input coupled through a voltage divider to a first end of a source resistor and a loop voltage input coupled to a second end of the resistor. The source resistor has its first end coupled to the transmitter and its second end coupled to the loop. The comparison circuit compares the reference voltage input with the loop voltage input to provide the feedback signal.

According to another aspect of the invention, the predistortion circuit includes memory for storing the mapping table. The memory includes (i) a first address input for addressing the mapping table with each source digital word to provide a corresponding predistortion digital word on a first data output and (ii) a second address input coupled to the signal source through a delay line for addressing the mapping table with a delayed source digital word to provide a corresponding delayed predistortion digital word on a second data output. The predistortion circuit further includes a control circuit for adjusting the delayed predistortion digital word in response to the feedback signal. The adjusted digital word is coupled to a data input of the memory to update the memory. Preferably, the feedback signal to the predistortion circuit comprises a binary signal having a first level and a second level such that the control circuit increments the value of the delayed predistortion digital word in response to the first level and decrements the value of the delayed predistortion digital word in response to the second level.

The predistortion of the present invention avoids having to reduce modem transmit power in order to reduce telephone noise, thereby maintaining modem bit rates, especially on long transmission loops. Another advantage of the present invention is that modem retraining time due to impedance changes (i.e., switches between on-hook and off-hook states) is reduced.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE INVENTION

Figure 1:
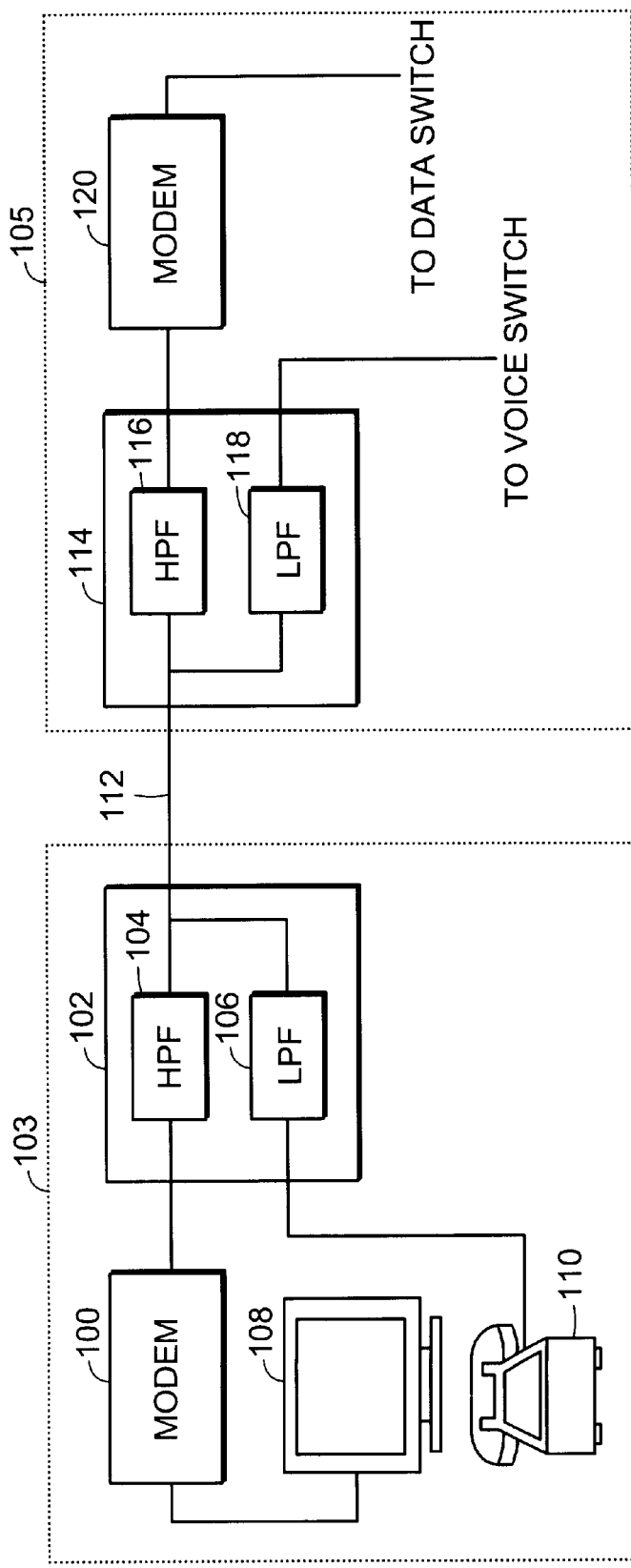
FIG. 1 is a block diagram showing a passive splitter-based ADSL system known in the prior art.
Figure 2:
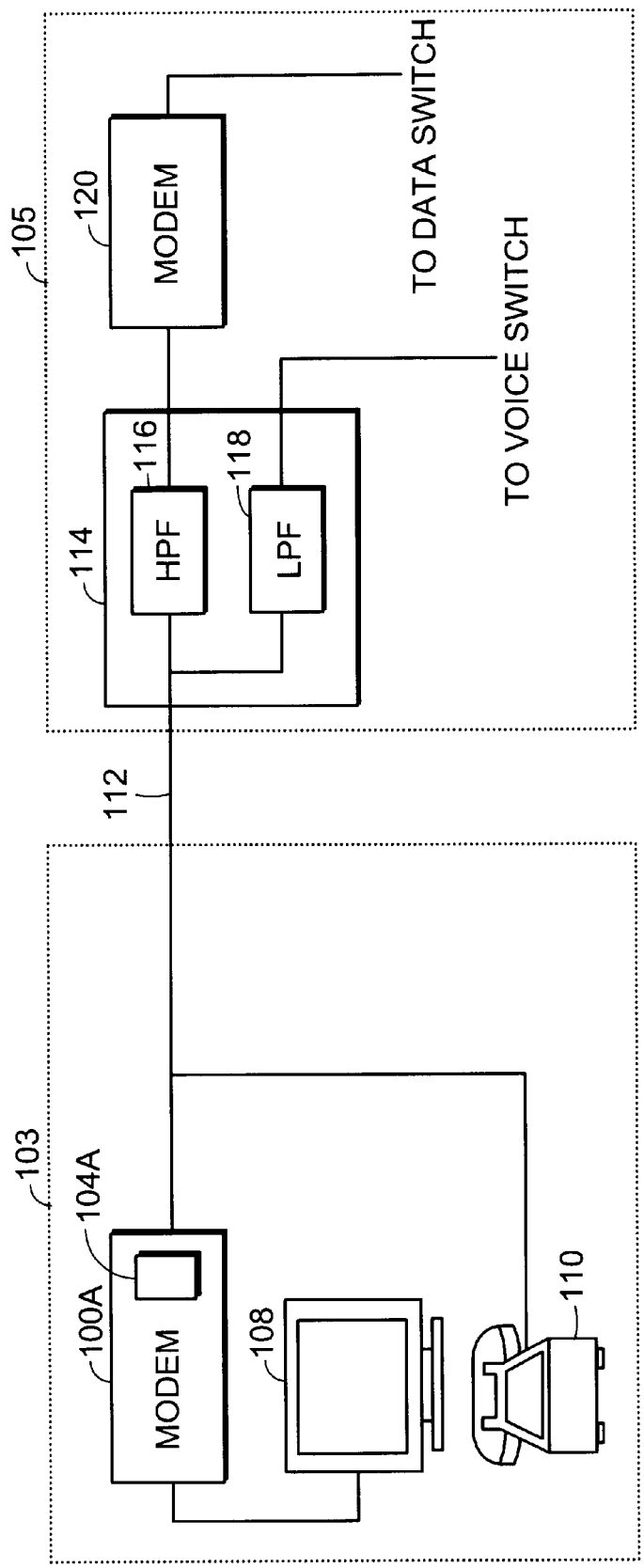
FIG. 2 is a block diagram showing a splitterless-based ADSL system known in the prior art.
Figure 3:
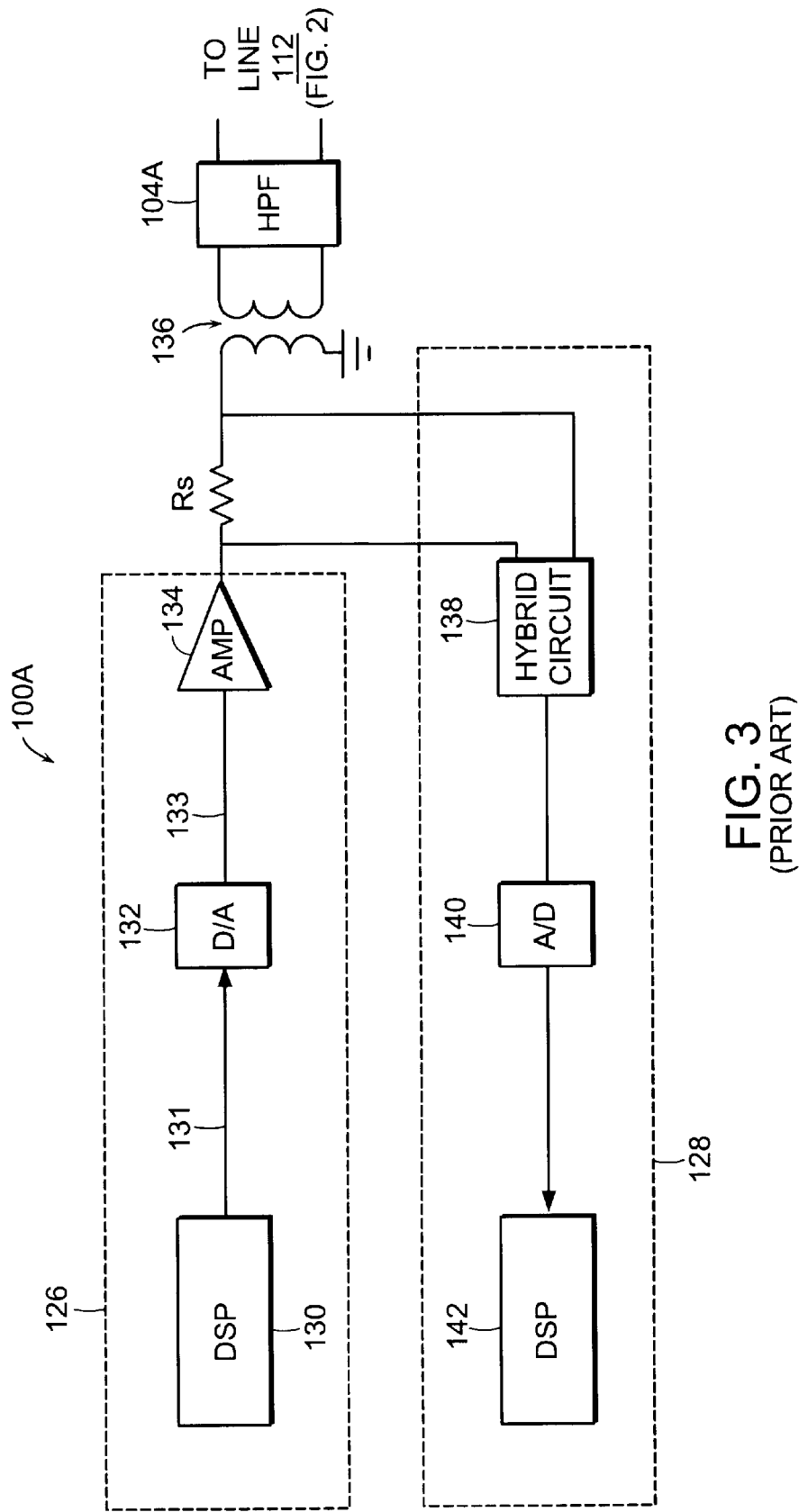
FIG. 3 is a schematic block diagram of a splitterless modem for use in the prior art system of FIG. 2.

Referring to FIG. 3, splitterless modem 100A for use in the prior art system of FIG. 2 is shown. The modem 100A includes a transmitter 126, a receiver 128, a source resistor $R_S$, a transformer 136 and high pass filter (HPF) 104A. The transmitter 126 includes a digital signal processor (DSP) 130, a digital-to-analog (DAC) converter 132 and signal amplifier 134. The receiver 128 includes a hybrid circuit 138 coupled across source resistor $R_S$, analog-to-digital converter (ADC) 140 and DSP 142.

In the transmitter 126, the DSP 142 generates a data signal 131 in pulse code modulation (PCM) format that comprises a series of digital words each representing a desired voltage to be placed on the loop 112 (FIG. 2). The DAC 132 converts the PCM digital words to provide an analog voltage signal 133 that is passed through amplifier 134 to feed source resistor $R_S$ and then to the loop 112 through transformer 136 and HPF 104A. The source resistor $R_S$ forms a voltage divider with the loop impedance and input impedance of the modem 120 (FIG. 2) located at the central office. From well-known transmission principles, the source resistor $R_S$ is ideally equal to the loop and input impedances such that the voltage divider provides the optimal divide by 2. However, when the analog telephone 110 is coupled across the loop 112 (FIG. 2), the source resistor $R_S$ effectively sees a lower resistance that is nonlinear due to the nonlinear impedance of the telephone, causing the voltage division to be greater than 2 and to be nonlinear. The nonlinear voltage division produces intermodulation products in the voice band that appears as noise in the telephone. Note that the source resistor $R_S$ can comprise one or more resistors.

Figure 4:
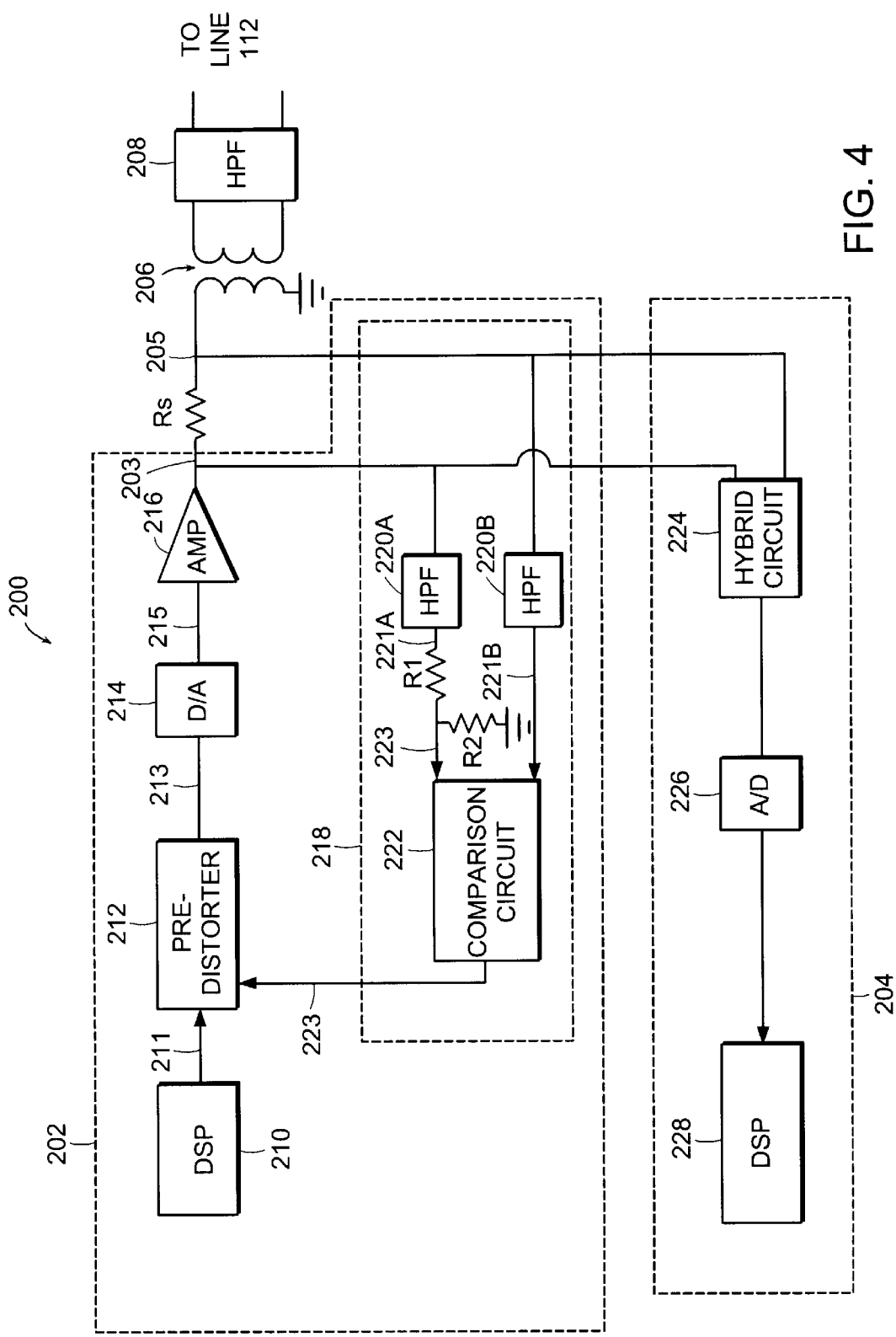
FIG. 4 is a schematic block diagram of a splitterless ADSL modem in accordance with the present invention.

Referring now to FIG. 4, a modem 200 of the present invention is shown. The modem 200 is a customer premises-located ADSL modem that includes a transmitter 202, a receiver 204, a source resistor $R_S$, a transformer 206 and a high pass filter 208. The transmitter 202 includes a DSP 210, a predistortion circuit 212, a DAC 214, a signal amplifier 216 and a feedback circuit 218. The receiver 204 includes a hybrid circuit 224 coupled across source resistor $R_S$, ADC 226 and DSP 228.

The predistortion circuit 212, as described further herein, provides a mapping table that maps PCM digital words 211 sourced from DSP 210 to provide predistortion digital words 213 that predistort the analog signal 215 output from the DAC 214 so that the voltage on the loop 112 is the correct divide by 2 with no nonlinearities.

The feedback circuit 218 is used to measure the amount of nonlinearity on the loop and provide feedback to the predistortion circuit 212. In addition to modem transmit signals from modem 200, the loop has telephone signals from the telephone 110 (FIG. 2) and modem receive signals from the central office modem 120 (FIG. 2). The linearization provided by the combination of the predistortion circuit 212 and the feedback circuit 218 benefits from the fact that the telephone and modem receive signals are generally uncorrelated with the modem transmit signals. By averaging over enough PCM values, as described further below, the linearized modem transmit signal is assured to be independent of the uncorrelated telephone and modem receive signals.

The feedback circuit 218 includes high pass filters (HPFs) 220A, 220B which are coupled to respective terminals 203, 205 of source resistor $R_S$ and filter out signals from the telephone 110 (FIG. 2). Output 221A from HPF 220A is fed through a voltage divider comprising resistors R1 and R2 to provide a filtered reference voltage to a first input 223 of a comparison circuit 222. Output 221B from HPF 220B provides a filtered loop voltage to a second input of comparison circuit 222. The comparison circuit 222 compares the voltage levels on the first and second inputs 223, 221B to provide an output feedback signal on line 223 that is fed to predistortion circuit 212. The feedback signal 223 is a binary signal. If the loop voltage is greater than the reference voltage, then the predistortion is reduced. If the loop voltage is less than the reference voltage, then the predistortion is increased.

Figure 5:
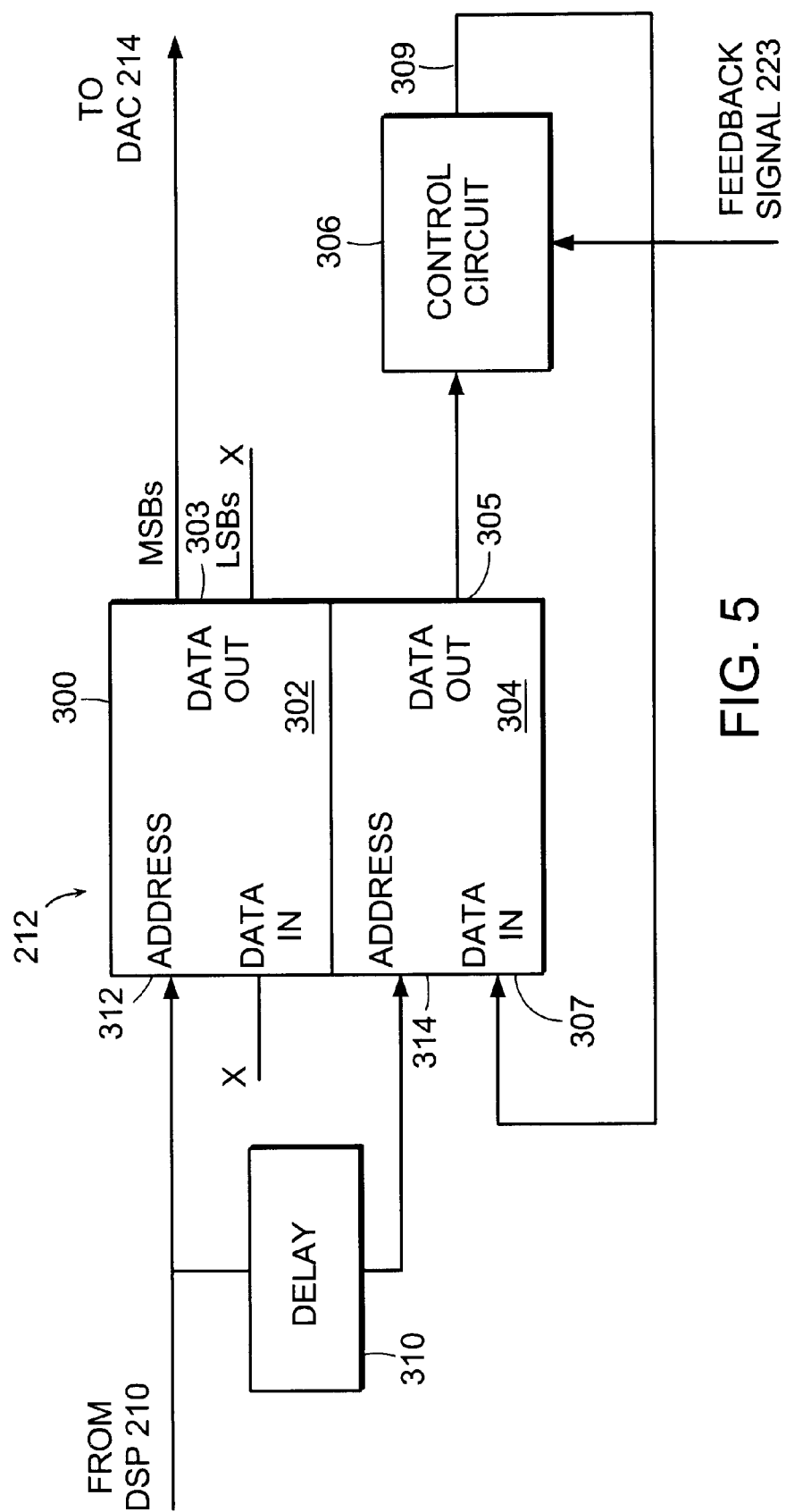
FIG. 5 is a schematic block diagram of a first embodiment of a predistortion circuit for use in the ADSL modem of FIG. 4.

FIG. 5 shows a first embodiment of predistortion circuit 212. The predistortion circuit 212 includes a dual port memory (DPRAM) 300, a delay circuit 310 and a control circuit 306. The DPRAM 300 includes an upper port 302 and a lower port 304. Each PCM digital word 211 output from DSP 210 (FIG. 4) is a 16-bit word that is used as an input address into address line 312 of the upper port 302. The contents of the DPRAM 300 at a particular input address provides a 20-bit predistortion digital word on data output 303. The 16 most significant bits (MSBs) of the predistortion digital word are passed to the DAC 214 (FIG. 4) to effect the desired voltage on the loop 112 (FIG. 2).

The PCM output from DSP 210 is also delayed through delay circuit 310 to compensate for delays encountered in the DPRAM 300, the DAC 214 and the feedback circuit 218. The delayed 16-bit PCM digital word is applied as an input address into address line 314 of the lower port 304. The full 20-bit predistortion digital word stored at the particular input address is provided at data output 305 and is passed to control circuit 306. The control circuit 306, in response to the feedback signal 223, increments the value of the predistortion digital word if the predistortion is to be increased and decrements the value if the predistortion is to be decreased. The adjusted predistortion digital word output at 309 is then stored in the DPRAM 300 at the referenced address through data input 307.

As noted above, it is desirable to average over enough PCM values to filter out the effects from modem receive signals and telephone signals. The 4 least significant bits (LSBs) of the 20-bit predistortion digital word, which are not passed to the DAC 214, provide a filtering function such that the predistortion must be increased or decreased a number of times (e.g., 16 times with 4 bits) before actually affecting the predistortion voltage seen on the loop 112 (FIG. 2).

Figure 6:
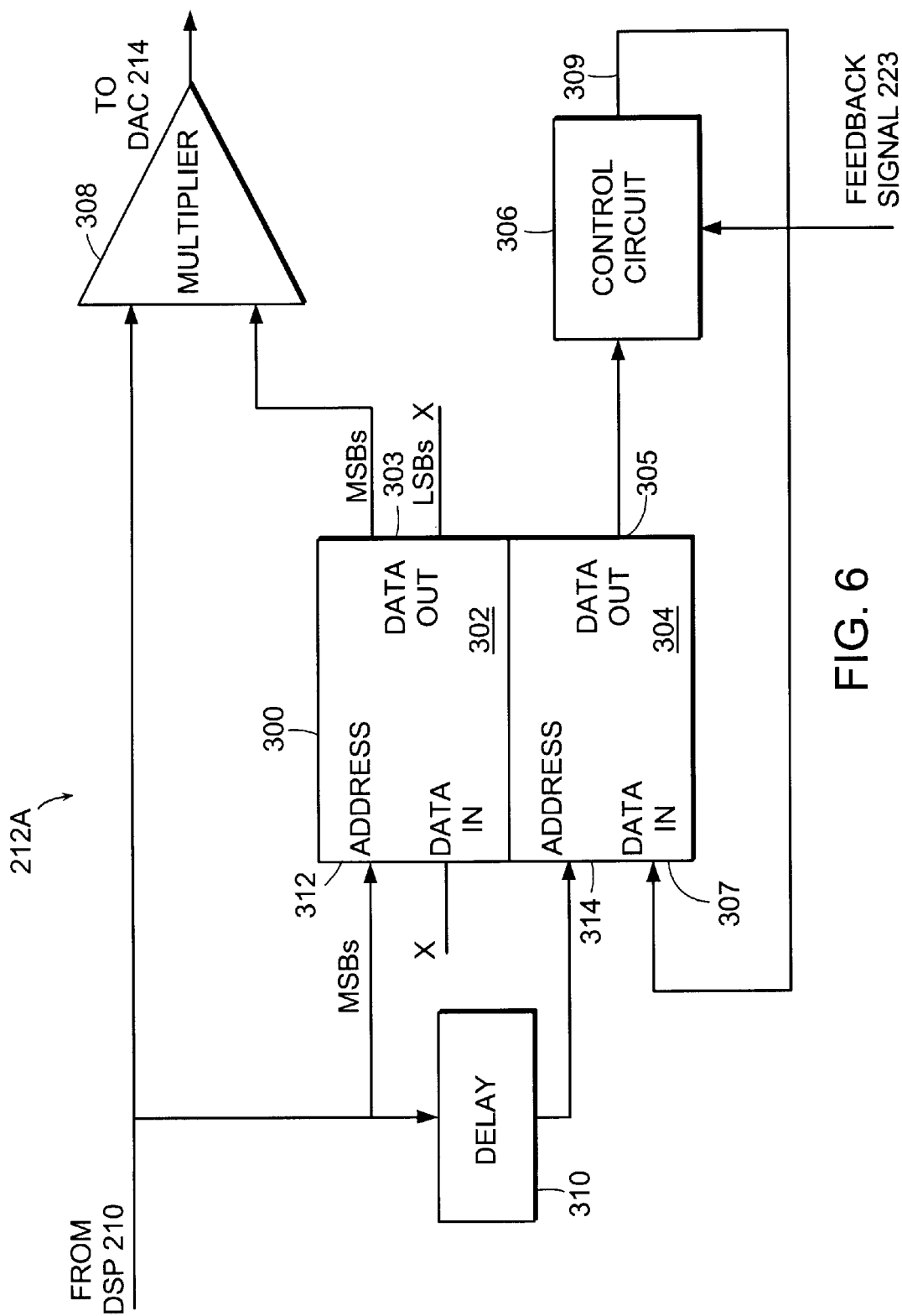
FIG. 6 is a schematic block diagram of a second embodiment of a predistortion circuit for use in the ADSL modem of FIG. 4.

FIG. 6 shows a second embodiment of a predistortion circuit 212A. The predistortion circuit 212A includes DPRAM 300, delay circuit 310, control circuit 306 and a multiplier 308. In this second embodiment, only the 8 MSBs of the 16-bit PCM digital word 211 output from DSP 210 (FIG. 4) are used as an input address into address line 312 of the upper port 302. The DPRAM 300 stores a multiplier digital word that represents only the amount of predistortion instead of storing the full PCM voltage value as done in the first embodiment (FIG. 5). The 16 MSBs of the predistortion digital word are passed to the multiplier 308 where its value is multiplied by the 16-bit PCM digital word 211 before being sent to DAC 214 (FIG. 4) to effect the desired voltage on the loop 112 (FIG. 2).

Over a period of time, as a range of voltage values in the modem transmit signal are encountered, both embodiments can be expected to converge to a set of predistortion values stored in DPRAM 300 that compensate for actual nonlinear impedances coupled to the loop 212 (FIG. 2). However, the second embodiment of FIG. 6 converges faster since there are fewer locations (i.e., 64K locations in the first embodiment versus 256 locations in the second embodiment) in the DPRAM 300 to adjust. In an alternate embodiment, the function of the DPRAM 300 can be moved into the DSP 210.

While the preferred embodiments of the invention have been described with reference to a passive process of learning the predistortion values stored in DPRAM 300, the present invention also encompasses an approach to learning in which the modem 200 employs an active learning mode, perhaps as part of a general modem training process.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A modem device comprising:
   a transmitter including (a) a signal source providing a source data signal and (b) a predistortion circuit for predistorting the source data signal to provide a modem transmit signal for coupling to a transmission loop having a nonlinear impedance coupled thereto, the predistortion circuit compensating for distortion of the modem transmit signal due to the nonlinear impedance; and
   a receiver for receiving a modem receive signal from the transmission loop.

2. The modem device of claim 1 wherein the source data signal comprises source digital words, each source digital word corresponding to a particular analog voltage level, and wherein the predistortion circuit includes a mapping table for mapping the source digital words to predistortion digital words, each predistortion digital word corresponding to a particular desired analog voltage level and the transmitter further includes a digital-to-analog converter for converting the predistortion digital words into the modem transmit signal.

3. The modem device of claim 1 wherein the transmitter further includes a feedback circuit coupled to the transmission loop for measuring the distortion of the modem transmit signal to provide a feedback signal to the predistortion circuit indicative of the measured distortion, the predistortion circuit adjusting the predistortion in response to the feedback signal.

4. The modem device of claim 3 wherein the modem device includes a source resistor having a first end coupled to the transmitter and a second end coupled to the loop, and wherein the feedback circuit includes a comparison circuit having a reference voltage input coupled through a voltage divider to the first end of the source resistor and a loop voltage input coupled to the second end of the source resistor, the comparison circuit comparing the reference voltage input and the loop voltage input to provide the feedback signal.

5. The modem device of claim 3 wherein the source data signal comprises source digital words, each source digital word corresponding to a particular analog voltage level, and wherein the predistortion circuit includes a mapping table for mapping the source digital words to predistortion digital words, each predistortion digital word corresponding to a particular desired analog voltage level and the transmitter further includes a digital-to-analog converter for converting the predistortion digital words into the modem transmit signal.

6. The modem device of claim 5 wherein the predistortion circuit includes memory for storing the mapping table, the memory having a first address input for addressing the mapping table with each source digital word to provide a corresponding predistortion digital word on a first data output and a second address input coupled to the signal source through a delay line for addressing the mapping table with a delayed source digital word to provide a corresponding delayed predistortion digital word on a second data output, and a control circuit for adjusting the delayed predistortion digital word in response to the feedback signal, the adjusted digital word being coupled to a data input of the memory to update the memory.

7. The modem device of claim 6 wherein the feedback signal comprises a binary signal having a first level and a second level and wherein the control circuit increments the value of the delayed predistortion digital word in response to the first level and decrements the value of the delayed predistortion digital word in response to the second level.

8. The modem device of claim 3 wherein the source data signal comprises source digital words, each source digital word corresponding to a particular analog voltage level, and wherein the predistortion circuit includes (i) a mapping table for mapping the source digital words to predistortion digital words, each predistortion digital word corresponding to a particular desired analog voltage level and (ii) a multiplier for multiplying each source digital word with the corresponding predistortion digital word from the mapping table to provide a multiplier digital word and wherein the transmitter includes a digital-to-analog converter for converting the multiplier digital word into the modem transmit signal.

9. A method for communicating a modem transmit signal across a transmission loop having a nonlinear impedance coupled thereto, the method comprising the steps of:

providing a source data signal;

predistorting the source data signal to provide a modem transmit signal, the predistortion compensating for distortion of the modem transmit signal due to the nonlinear impedance; and coupling the modem transmit signal to the transmission loop.

10. The method of claim 9 wherein the step of providing a source data signal comprises providing source digital words, each source digital word corresponding to a particular analog voltage level, and wherein the predistorting step includes mapping the source digital words to predistortion digital words, each predistortion digital word corresponding to a particular desired analog voltage level; the method further including the step of converting the predistortion digital words into the modem transmit signal.

11. The method of claim 10 further including the steps of measuring the distortion of the modem transmit signal to provide a feedback signal indicative of the measured distortion, and adjusting the predistortion in response to the feedback signal.

12. The method of claim 9 wherein the step of providing a source data signal comprises providing source digital words, each source digital word corresponding to a particular analog voltage level, and wherein the predistortion step includes (i) mapping the source digital words to predistortion digital words, each predistortion digital word corresponding to a particular desired analog voltage level and (ii) multiplying each source digital word with the corresponding predistortion digital word to provide a multiplier digital word and further including the step of converting the multiplier digital word into the modem transmit signal.

13. A modem device having a transmitter and a receiver, the transmitter comprising:

a digital signal processor providing a source data signal;

a predistortion circuit for predistorting the source data signal to provide a modem transmit signal for coupling to a transmission loop having a nonlinear impedance coupled thereto, the predistortion circuit compensating for distortion of the modem transmit signal due to the nonlinear impedance; and a feedback circuit coupled to the transmission loop for measuring the distortion of the modem transmit signal to provide a feedback signal to the predistortion circuit indicative of the measured distortion, the predistortion circuit adjusting the predistortion in response to the feedback signal.

14. The modem device of claim 13 wherein the source data signal comprises source digital words, each source digital word corresponding to a particular analog voltage level, and wherein the predistortion circuit includes (i) a mapping table for mapping the source digital words to predistortion digital words, each predistortion digital word corresponding to a particular desired analog voltage level and (ii) a multiplier for multiplying each source digital word with the corresponding predistortion digital word from the mapping table to provide a multiplier digital word and wherein the transmitter includes a digital-to-analog converter for converting the multiplier digital word into the modem transmit signal.

15. The modem device of claim 14 wherein the feedback signal comprises a binary signal having a first level and a second level and wherein the predistortion circuit increments the value of the predistortion digital word in response to the first level and decrements the value of the predistortion digital word in response to the second level.

16. The modem device of claim 13 wherein the source data signal comprises source digital words, each source digital word corresponding to a particular analog voltage level, and wherein the predistortion circuit includes a mapping table for mapping the source digital words to predistortion digital words, each predistortion digital word corresponding to a particular desired analog voltage level and the transmitter further includes a digital-to-analog converter for converting the predistortion digital words into the modem transmit signal.

17. The modem device of claim 16 wherein the feedback signal comprises a binary signal having a first level and a second level and wherein the predistortion circuit increments the value of the predistortion digital word in response to the first level and decrements the value of the predistortion digital word in response to the second level.

18. The modem device of claim 16 wherein the predistortion circuit includes memory for storing the mapping table, the memory having a first address input for addressing the mapping table with each source digital word to provide a corresponding predistortion digital word on a first data output and a second address input coupled to the signal source through a delay line for addressing the mapping table with a delayed source digital word to provide a corresponding delayed predistortion digital word on a second data output, and a control circuit for adjusting the delayed predistortion digital word in response to the feedback signal, the adjusted digital word being coupled to a data input of the memory to update the memory.

19. The modem device of claim 13 wherein the modem device includes a source resistor having a first end coupled to the transmitter and a second end coupled to the loop, and wherein the feedback circuit includes a comparison circuit having a reference voltage input coupled through a voltage divider to the first end of the source resistor and a loop voltage input coupled to the second end of the source resistor, the comparison circuit comparing the reference voltage input and the loop voltage input to provide the feedback signal.

* * * * *